United States Patent [19]
Harter

[11] 3,980,362
[45] Sept. 14, 1976

[54] POSITION FINDING AND COURSE DETERMINING INSTRUMENT

[76] Inventor: B. Wayne Harter, 823 Canyon Road, Redwood City, Calif. 94062

[22] Filed: Aug. 28, 1974

[21] Appl. No.: 501,821

[52] U.S. Cl. ............................. 312/231; 33/1 SD; 40/28 R; 206/215; 206/371; 33/1 N
[51] Int. Cl.² ........................................ A47B 27/00
[58] Field of Search .......... 33/1 SD, 1 B, 1 N, 76 R; 312/231; 206/224, 371, 215; 108/93; 40/28 R

[56] References Cited
UNITED STATES PATENTS

| | | | |
|---|---|---|---|
| 259,441 | 6/1882 | Van Kirk | 312/231 |
| 647,339 | 4/1900 | Thompson | 33/1 N |
| 684,866 | 10/1901 | Ringdahl | 24/72.5 |
| 1,245,304 | 11/1917 | Zona | 33/1 N |
| 1,314,915 | 9/1919 | Trullench | 206/224 |
| 1,577,056 | 3/1926 | Bjork | 33/76 R |
| 2,420,673 | 5/1947 | Monrad | 33/1 SD |
| 2,546,836 | 3/1951 | Saloschin | 33/1 SD |
| 2,618,856 | 11/1952 | Sweet | 33/1 SD |
| 2,675,262 | 4/1954 | Meighan | 24/134 L |
| 2,991,555 | 7/1961 | Cambiaso | 33/1 SD |
| 3,540,127 | 11/1970 | Kane | 33/1 SD |

FOREIGN PATENTS OR APPLICATIONS

| | | | |
|---|---|---|---|
| 146,545 | 5/1918 | United Kingdom | 33/1 SD |

*Primary Examiner*—Richard E. Aegerter
*Assistant Examiner*—John W. Shepperd

[57] ABSTRACT

An attache-type case combined with a specially designed plotting board as an integral part thereof and incorporating a new and highly simplified position and course-finding instrument, all of which provides in one convenient, compact, and portable kit all equipment needed to guide a small craft through pilot waters, with all operations in time of emergency requiring the use of only one hand.

1 Claim, 9 Drawing Figures

POSITION FINDING AND COURSE DETERMINING INSTRUMENT

BRIEF SUMMARY OF THE INVENTION

An explosion in registrations for small pleasure craft in recent years has created a pressing need for piloting and navigation devices which combine compactness and portability with the ultimate in simplicity and dependability. Conventional, time-honored piloting methods, such as the actual plotting of courses and bearings on nautical charts, still have merit not equalled by any alternative method conceived to date, and should be used whenever circumstances permit; but occasions constantly arise when the short-handed or lone sailor cannot divert his attention from the helm for a long enough period of time to use such methods. And yet, it is precisely at these times, when conditions of wind and sea demand undivided attention at the helm, that the mariner is in greatest need of reliable position data to avoid grounding his vessel.

The response to this need has been a multitude of devices flooding onto the market. These devices have, for the most part, met with very limited or poor acceptance because, while they solve certain aspects of the problem, they leave many other important aspects unsolved, or they introduce new problems not foreseen by their developers. The following brief description of my own invention, and the specification which follows, will point out in considerable detail numerous inadequacies in existing technology and will explain how my invention overcomes them.

More particularly, then, my invention is a complete piloting and navigational station, comprised of three basic, identifiable items, which could be used separately but which are preferably combined for use into a single, integrated unit or system, and which for this reason are claimed hereafter as separate parts of a single invention. These items are as follows:

1. Attaché or chart case combined with plotting board.

Attaché and chart cases are regularly advertised in such as aeronautical supply catalogs, and the same applies to a wide variety of plotting, drawing, and display boards. With the present state of the art, however, one must carry charts, instruments, worksheets, publications, etc., in the chart case with one hand while carrying his plotting board in the other—if his piloting station is to have that essential ingredient of mobility.

This quality of portability encourages that kind of pre-planning which adds immeasurable challenge, pleasure, and safety to a cruise—pre-planning such as plotting of courses and distances to intended destinations and intermediate check points, and into harbors of refuge along the way, and computing and plotting of danger bearings, ranges, etc., etc.—things one has little chance to do after a crisis develops.

The combination disclosed, however, constitutes a tool which does produce more in combination than when separated. It does this by a. Permitting one hand to do work formerly requiring two hands, and thus increasing human efficiency b. Adding ballast and stability to a lap-size plotting board so that it will not move about in an unstable cockpit, or be carried overboard by strong winds, while at the same time clearly preserving that essential element of portability c. Bringing together and organizing in one place all the many tools, instruments, and accessories needed to do a complete job of piloting, thus reducing the probability of their becoming scattered, misplaced, and not readily available and within easy reach when needed.

2. A plotting and display board, or working surface, with certain specially designed and innovative features.

A wide variety of charting and display boards can be found advertised in both nautical and aeronautical supply catalogs. These boards invariably use devices for securing charts to the working surface which protrude above such surface and thus prevent the proper use of plotting and position finding instruments, or they laminate charts between layers of plastic in such a way that changing of charts in a pitching and windy cockpit is virtually impossible. They further require the cutting of charts to board size, or the folding of the overhanging parts of charts around the sharp or squared sides of the board with resulting creases, and exposure of overhanging parts to abrasion, tearing, and cockpit moisture, all of which leads to distortion of the shape of charts so their usefulness is seriously impaired or destroyed. In addition, they either flex under the pressure of a pencil and straight-edge or they use some kind of plastic overlay which requires the use of an unwieldy and messy grease pencil—all serious disadvantages. Those which are designed for use in one's lap, moreover, are normally of such light weight that a strong wind can carry them overboard, along with charts, so that the mariner is left with nothing to guide him to the nearest haven. It must be further pointed out in this context that chart boards described in two or three patent abstracts but no longer available commercially employ roller mechanisms to secure charts to the working surface. Such securing mechanisms are fundamentally different from the innovations with which my board is equipped, and are just as unsatisfactory as those devices mentioned above. This point is developed more fully hereafter.

My own board overcomes all the foregoing defects, as well as others which will be disclosed in the statement of specification. My board employs gently rounded ends so that the chart overhang is never creased or folded as it is guided into a weather-tight compartment, and this lap-size board will accommodate charts longer than N.O.S. Small Craft size without cutting. It makes use of a new eccentric locking device to secure charts in place which does not protrude above the working surface, or in any way interfere with the use of plotting and position finding instruments. It provides, moreover, for instantaneous changing of charts, as will be described hereafter, and in its preferred combination with attaché case it has enough weight and stability to stay in place when the vessel heels sharply in a puff of wind.

3. Position and course-finding instrument

When the short-handed or lone sailor encounters conditions of wind and sea which do not permit the plotting of courses and lines of position, his very survival can depend on the availability of some device which will serve as a workable substitute for these methods without at the same time requiring the use of more than one of his hands. My device provides this capability while retaining the ultimate in simplicity and dependability.

Several devices now on the market seek to simplify the problem of finding position and course, but they still do this by transferring lines from a compass rose (or nearest meridian in lieu thereof) which must actually be drawn on the device or underlying chart, often with unwieldy and messy grease pencil. Draw of lines with pencil and straight-edge, it must again be emphasized, requires the use of both hands.

By introducing the very simple expedient of actually and physically moving an enlarged compass rose over the chart, I have eliminated the need to enter on the chart actual bearing and course lines. The result is determination of position and new course with only one hand and a minimum of time and effort. The same thing applies to course correcting vector diagrams, as will be explained in detail hereafter.

Most instruments bearing some element of similarity to mine also use an enlarged compass rose but in these cases it is somehow physically attached to the accompanying device, which in turn houses or accommodates a portion of a nautical chart. Because of this physical connection, this rose or circular protractor is accepted as a part of a single invention. To accomplish the necessary end, my rose must be free to move about over the chart. It cannot be attached by some peripheral hinging arrangement or centralized axle or rivet. It is, nevertheless, still an essential part of my integrated piloting system, and is therefore claimed hereafter as a part of a single invention.

BRIEF DESCRIPTION OF VIEWS

DETAILED DESCRIPTION

Figure 1:
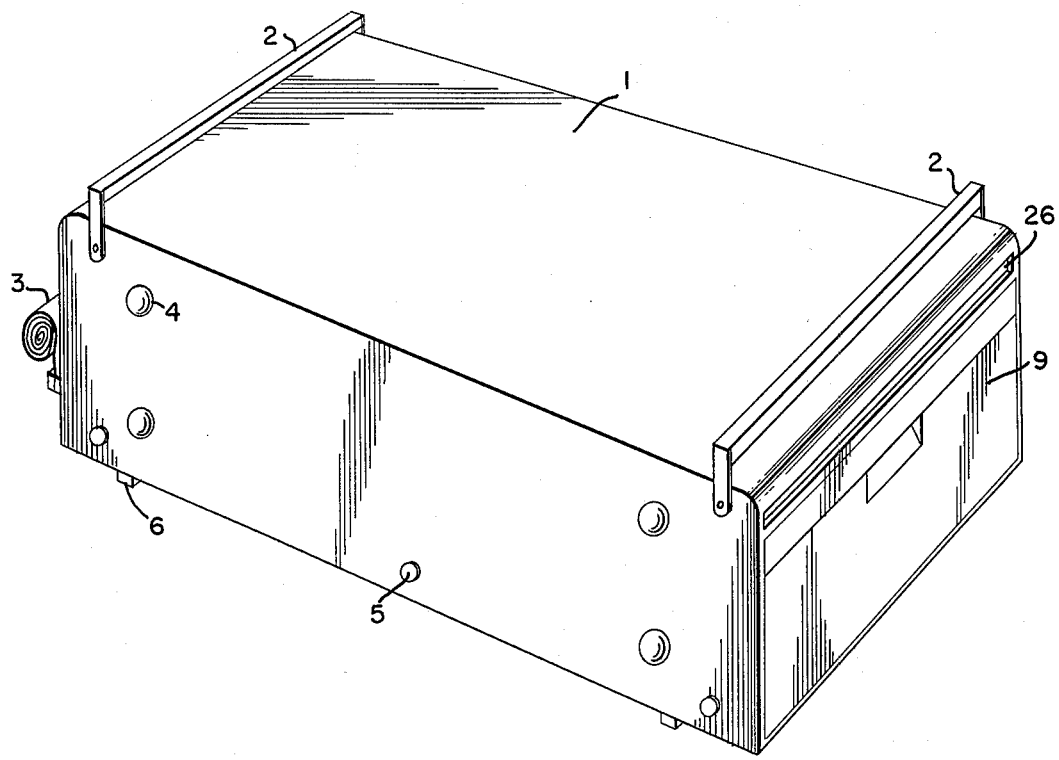
FIG. 1 is a perspective view of the entire kit with no intent to emphasize specific details.

The basic case illustrated in FIG. 1 is 6¼ high by 15¼ inches wide by 20 inches long, the scale of the drawing being ¼ inch = 1 inch. These dimensions can be modified some if this contributes to a production advantage, except that the width must be sufficient to accommodate a slot, Ref. 26, which is not less than 14¾ inches in length. It is through these slots in each end of the case that the charts must be threaded. The standard width of the small-craft chart is 14½ inches. Dimensions, as specified, are intentionally somewhat flexible to permit modification if government authorities should change the dimensions of the small-craft charts.

Construction material for the case, FIG. 1, can be any lightweight, reasonably strong, easily worked substance. It is probable that moulded plastic will be found by cost and marketing studies to present the optimum combination of characteristics. The operating model has been framed with one-half inch square strips of pine, and panelled with Masonite. The bottom of the instrument tray, FIG. 5, might be made of perforated peg board material to allow the operator maximum flexibility in arranging his instruments to suit his individual taste.

Figure 2A:
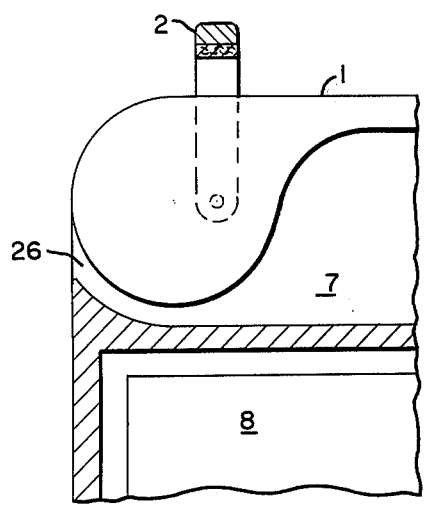
FIG. 2 is an actual size side view of the upper-left corner of the kit, with facing panel removed, to emphasize the manner in which charts are held in place and the way in which those parts of the charts not being displayed are temporarily stored.
Figure 2B:
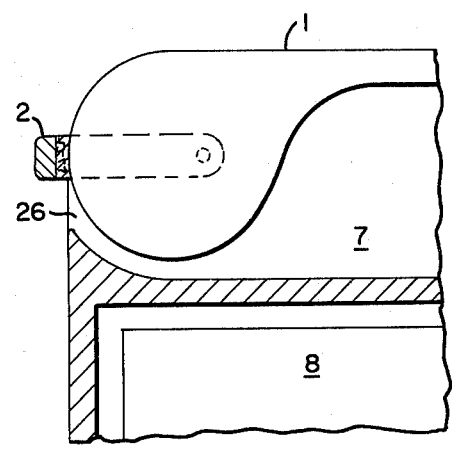

FIG. 2 presents a full scale (actual size) side view with the facing panel removed. Here one can see the slot, Ref. 26, through which charts are threaded and the shallow compartment, Ref. 7, which accommodates that part of the chart which is in use but not actually in view on the display surface, Ref. 1. (Small-craft charts are approximately 33 inches in length.)

Also shown in FIG. 2 is the lock-bar mechanism, Ref. 2, which holds the chart in position on the display and plotting surface, Ref. 1. It will be noted that the pivot point of the lock-bar mechanism is positioned on the horizontal center line of the circle but offset inward from the vertical center line so that in down position it grips the chart firmly while in up position it provides clearance for threading the chart into place. The sides of these lock-bars which face the curved ends of the display surface are lined with a durable, resilient material which compresses slightly in lowered position while resuming original thickness in raised position. The operating model employs felt weather stripping in this application with excellent results. The relative positions of the part illustrated in FIG. 2 are securely maintained when the side panels are bonded into place. The lock-bars, Ref. 2, are, of course, affixed to the case outside the side panels, as is illustrated in FIGS. 1 and 3.

My device, on the other hand, does not roll charts. Small Craft Charts, which are almost twice the length of the plotting and display surface 1, bend over the gently-rounded ends of this surface with the overhanging parts of the chart passing through slots 26 in each end of the board and lying perfectly flat in the watertight compartment 7 which is below the plotting and display surface. All charts which will be needed for a given leg of a cruise are "stacked" or placed on the plotting and display surface in the sequence in which they will be needed, before the vessel leaves the security and safety of its anchorage. When the vessel later sails from one chart area into another, the lock bars are released, the top chart is lifted off, and the lock bars are re-engaged. This changing of charts requires about 5 seconds of time and the use of one hand.

Figure 3:
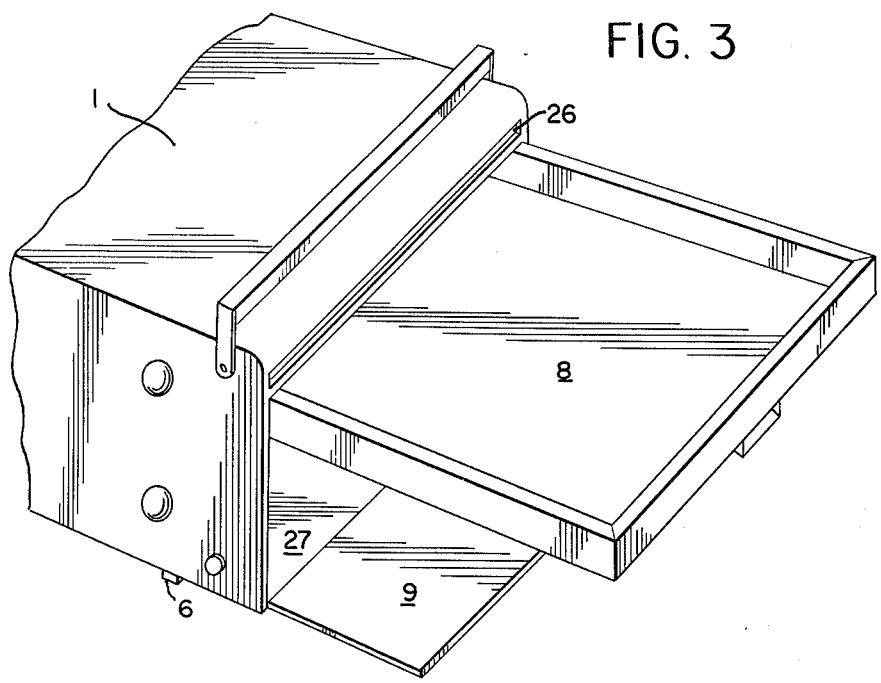
FIG. 3 is a perspective view which shows how the kit accommodates the instrument tray and how one gains access to the main storage compartment.

FIG. 3 illustrates the end door, Ref. 9, in open position, this providing access to the instrument tray and main storage compartment, Ref. 27. The instrument tray, Ref. 8, is pictured in partially withdrawn position. The main storage compartment, Ref. 27, accommodates such things as extra charts, tide tables, work sheets, pencil sharpener, chart light, hand-bearing compass, etc. The instrument drawer is described more fully hereafter.

FIG. 3, Ref. 6, is a non-skid strip running the width of the case, and is used to help keep it from moving about as the vessel rolls and pitches in a seaway, though the weight of the case itself has proved sufficient under most conditions to accomplish this objective. The operating model employs quarter-inch foam rubber adhesive weather stripping here, which has been found to provide some shock absorbing characteristics in addition to the desired non-slip function.

Figure 4A:
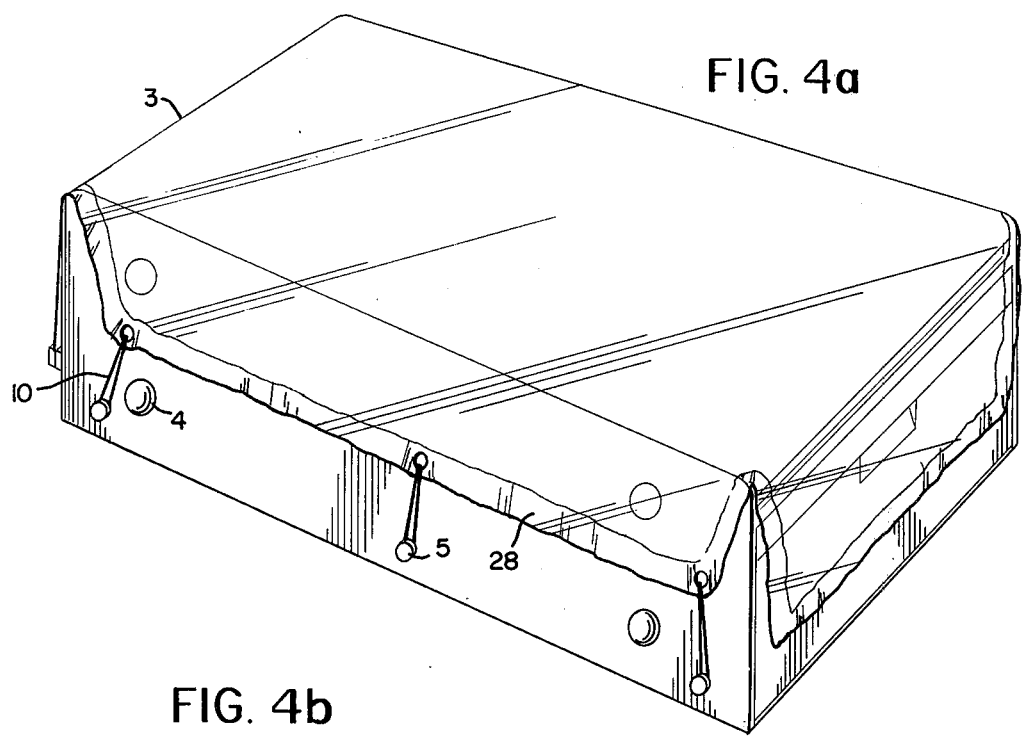
FIG. 4 is a perspective view illustrating the plastic weather cover.
Figure 4B:
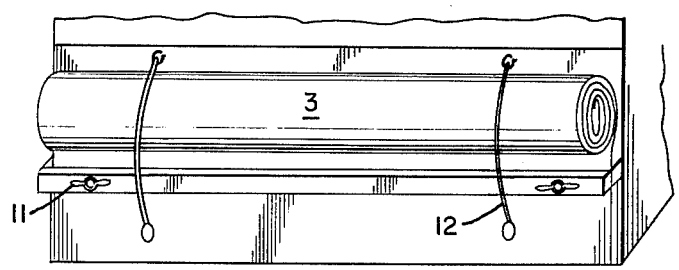

FIG. 4 illustrates in greater detail the transparent plastic weather cover, Ref. 3, in both open and rolled positions. A hem bordering the cover, Ref. 28, is cemented in place to guard against tearing of the plastic sheeting material. Nylon fabric used on the operating model has been found to have desirable strength and elasticity, though several alternate materials should be adequate. Elastic bands, Ref. 10, are permanently attached to eyelets in the cover, and looped over button-type studs, Ref. 5, to prevent the cover's being lifted by the wind when in use. The cover is stored in rolled position at the end of the case when the operator is entering plots or bearings on his chart, or when the kit is being transported from one location to another. Elastic bands permanently attached to eye-type screws below the rolled cover, Ref. 12, are looped over screw hooks above the rolled cover to secure it in place. On the operating model ordinary household or office rubber bands have been used for elastic loops and have been found satisfactory even in strong winds. Brass, bronze, or stainless wing nuts, Ref. 11, are used to secure the retaining bar in place, since this facilitates the changing of damaged covers. Side flaps are folded under when the cover is rolled so as to minimize fatigue where a certain amount of inevitable creasing takes place.

When the case is standing on the side which faces the viewer in FIGS. 1 and 4, as it would when set down momentarily while being transported as an attaché case, the button-type studs, Ref. 5, would cause it to be unstable if it were not for four items indicated as Ref. 4. On the operating model these are semi-spherical plastic devices (skids) available as common hardware items and used to raise furniture legs about one-quarter inch from the floor. The button-type studs, Ref. 5, on the operating model are simply round head, stainless steel wood screws. Both items could be an integral part of a moulded plastic panel.

Figure 5A:
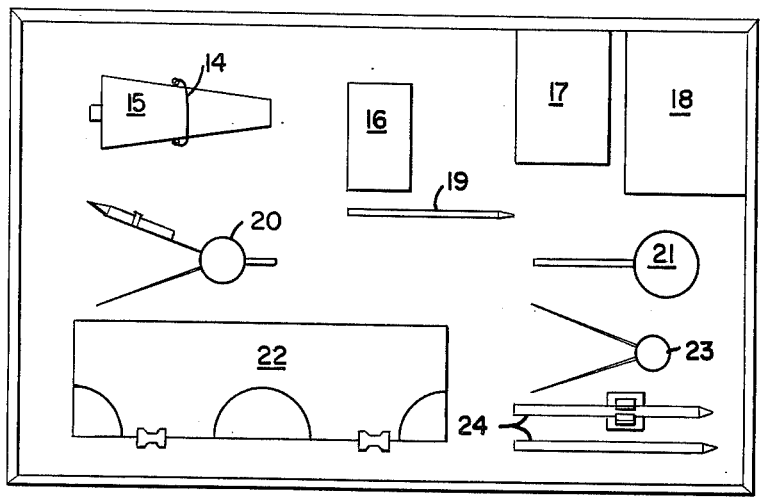
FIG. 5 is a top view illustrating a suggested layout for the instrument tray.
Figure 5B:

FIG. 5 illustrates the instrument tray. With the operating model two methods have been used to secure instruments, tools, and accessories in place. The first, Ref. 13, is a rubber finger-like gripper available from most marine suppliers and commonly used to secure such things as finishing rods. This gripper is cemented to the tray on the operating model and holds such things as pencils, Ref. 24; dividers, Ref. 23; chart reading lens, Ref. 21; stick eraser, Ref. 19; and draftsman's compass, Ref. 20. The other securing device is an elastic band (such as an ordinary household rubber band) which passes through holes in the bottom of the tray. On the operating model, this device is used to secure such items as the hand-held wind speed indicator, Ref. 15; scratch pad, Ref. 18; and Weems Paraline Plotter, Ref. 22. Ref. 17 is a compass deviation table and is held in place with transparent adhesive tape. Ref. 16 is a small tide table booklet.

The particular layout of instruments depicted in FIG. 5 and described in the preceding paragraph is not specified, but rather is illustrative only. A left-handed operator, for example, would use the kit with the carrying handle facing his body and with the instrument tray opening to his left. He would then want his scratch pad located in the corner occupied by pencils, Ref. 24, in the accompanying drawings. And so forth.

Note that the instrument tray 8 could also utilize that space just below the plotting and display surface 1 and just above the bottom of the shallow compartment 7 which accommodates the overhanging ends of charts. In such a case it would be withdrawn on the same side as the carrying handle, and would leave additional storage capacity in the main storage compartment 27.

It should be noted further than the main storage compartment 27 is large enough to carry H.O. 211 sight reduction tables, current marine almanac, reduction worksheets, and universal plotting sheets. With the exception then of the marine sextant, this portable station can include everything needed not only for local piloting but also for high seas navigation.

Repeated reference has been made to N.O.S. Small Craft Charts, since it is for charts of these dimensions that this device has been designed. By laying a Small Craft Chart over a standard chart to serve as a template anad moving it about until the least useful parts (usually land areas) have been eliminated, and properly labelling meridians and parallels at the margins thus established, one can have a set of Small Craft Charts for his own sailing waters which will last indefinitely.

Figure 6:
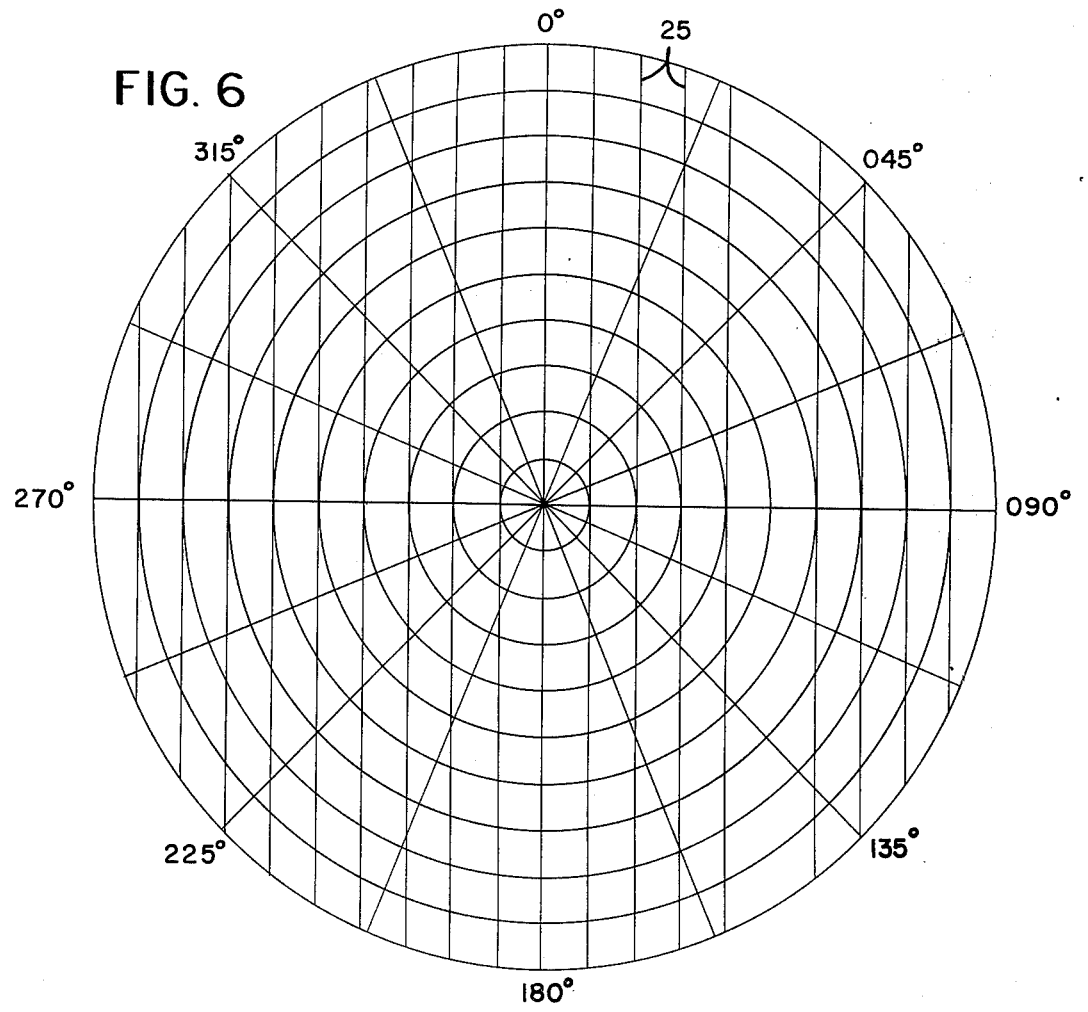
FIG. 6 is a simplified drawing of the new and improved position and course finding instrument.

FIG. 6 is a highly simplified drawing which eliminates much detail so as to emphasize more clearly those essential elements which qualify this tool as a new, improved, and useful device. This is an instrument for fixing one's position from known bearings taken on charted navigational aids and landmarks without the necessity of actually plotting crossed bearings or lines of position. The instrument is intended primarily for use with the N.O.S. Small-Craft Charts, but it can also be used satisfactorily with most of the nautical charts covering pilot waters. With a little practice one can determine his position by using only one hand, an important feature for the mariner who must keep one hand free to steady the helm. In addition, this device will permit its user to read the new true course, from his newly established position, to his intended destination, corrected, if need be, for drift.

The experimental model of this device is 10½ inches in diameter (though it could be larger) and fits comfortably in the main storage compartment, FIG. 3, Ref. 27. On the typical small-craft chart this instrument covers a geographic area large enough to include virtually all aids and landmarks from which useful bearings can be taken.

The working model of this device has been constructed from a U.S. Naval Oceanographic Office Maneuvering Board Sheet, H. O. 2665-10. Multiple lines, Ref. 25, were drawn on this form parallel to the 0° – 180° axis, and from this a full-size clear photographic negative was produced. The negative was then cemented to a 1/32 inch disc of transparent plastic. Production items would have the same information printed directly onto the plastic surface. The actual operating model is graduated in one degree increments rather than the 22½° increments shown in the simplified drawing, FIG. 6. For the examiner's additional information and convenience, a copy of H. O. 2665-10 accompanies these specifications.

In practice one takes bearings on two charted navigational aids or landmarks, preferably with a hand-bearing compass (requires only one hand), held at least 3 feet from any deviation-causing ferrous material. Local magnetic variation is then added (or subtracted) mentally to obtain true bearings. The vertical lines, Ref. 25, drawn parallel to the 0° – 180° axis on the position finding device (modified compass rose) now permit the operator to keep the north-south axis oriented with the meridians on the chart while the instrument is moved about on the chart until the lines representing the true bearings of the sighted objects actually intercept those objects on the chart. This again can be done with one hand, and with some practice is quite easy. When this is accomplished, the vessel's position has been fixed at the center of the instrument or compass rose. A small hole in the center of the device permits marking this location on the chart if desired.

From the position thus fixed the helmsman can now read the new true direction to his destination. If current is causing the vessel to drift off course and its vector can be estimated (from published tide table data, or from observed leeway since last fix), this device will now permit a correction of true course to compensate for such drift. Each circle represents one knot of speed. If the current then is estimated to be, let's say, 135° at 2 knots, the operator will proceed as follows:

1. Set dividers to length of line representing speed of vessel through the water (should require only one hand), or measure this distance on a pocket-size straight-edge, such as a 6 inch ruler.
2. Move out along that line which represents the direction of the current (135° in our example) a distance equal to the speed of the current (two circles in our example) and spot in this point by eye.
3. Place one point of the dividers (or the end of the straight-edge) on the point spotted in Step 2, and then swing dividers until the other point rests on the true course line (or until the measured distance on the straight-edge rests on the true course line).
4. That line which connects the two points established in Steps 2 and 3, determined by visual inspection or by straight-edge, now indicates the direction of the corrected course. Distance from the point thus set on the true course line back to the center of the instrument (compass rose) will now indicate the speed which the vessel will make over the bottom on the corrected heading.

While one embodiment of the invention has been shown and described, it will be apparent that other adaptations and modifications can be made without departing from the spirit and scope of the invention. Four independent claims are therefore submitted.

I claim:

1. A portable navigational plotting board and storage case for use with nautical charts, consisting of a rectangular case having a top, bottom, two long sides, and two short sides, said top forming a drafting board for a nautical chart, said top being joined to said long sides along its length and said top being separated from said short sides and thus forming two slots communicating to the inside of said case for storage of unused portions of nautical charts, the edges of said top defining said slots, being formed as semi-circles, said top further being provided with clamping members which are pivotally mounted to the top at a point nearer the center of said top than the centers of said semi-circles, said clamping member being U-shaped, with the legs being larger than the radius of said semi-circle, thus allowing a chart to be releasably clamped, one of said short sides being defined by a door which allows access to the inside of said rectangular case, an instrument tray with clamps for drawing instruments, and a storage compartment for charts and the like inside said rectangular case, means for slidably mounting said tray, the other of said short sides having a clamp for attaching transparent plastic weather cover to said rectangular case.

* * * * *